US009076450B1

(12) United States Patent
Sadek et al.

(10) Patent No.: US 9,076,450 B1
(45) Date of Patent: Jul. 7, 2015

(54) DIRECTED AUDIO FOR SPEECH RECOGNITION

(71) Applicant: Rawles LLC, Wilmington, DE (US)

(72) Inventors: Ramy S. Sadek, Mountain View, CA (US); Edward Dietz Crump, Santa Cruz, CA (US); Joshua Pollack, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 104 days.

(21) Appl. No.: 13/624,667

(22) Filed: Sep. 21, 2012

(51) Int. Cl.
*G10L 15/00* (2013.01)
*G10L 15/26* (2006.01)
*G10L 15/34* (2013.01)

(52) U.S. Cl.
CPC ...................................... *G10L 15/34* (2013.01)

(58) Field of Classification Search
USPC ...................................... 704/231–257; 381/92
See application file for complete search history.

(56) References Cited

U.S. PATENT DOCUMENTS

| 6,594,367 | B1 * | 7/2003 | Marash et al. ................... 381/92 |
| 7,146,315 | B2 * | 12/2006 | Balan et al. ................... 704/233 |
| 7,418,392 | B1 | 8/2008 | Mozer et al. |
| 7,567,678 | B2 * | 7/2009 | Kong et al. ...................... 381/92 |
| 7,720,683 | B1 | 5/2010 | Vermeulen et al. |
| 7,774,204 | B2 | 8/2010 | Mozer et al. |
| 8,483,406 | B2 * | 7/2013 | Buck et al. ...................... 381/92 |
| 2002/0143532 | A1 * | 10/2002 | McLean et al. ............... 704/235 |
| 2012/0223885 | A1 | 9/2012 | Perez |
| 2012/0224715 | A1 * | 9/2012 | Kikkeri ........................... 381/92 |
| 2012/0284023 | A1 * | 11/2012 | Vitte et al. .................... 704/233 |

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Jesse Pullias
(74) *Attorney, Agent, or Firm* — Lee & Hayes, PLLC

(57) ABSTRACT

Techniques are described for selecting audio from locations that are most likely to be sources of spoken commands or words. Directional audio signals are generated to emphasize sounds from different regions of an environment. The directional audio signals are processed by an automated speech recognizer to generate recognition confidence values corresponding to each of the different regions, and the region resulting in the highest recognition confidence value is selected as the region most likely to contain a user who is speaking commands.

20 Claims, 3 Drawing Sheets

DIRECTED AUDIO FOR SPEECH RECOGNITION

BACKGROUND

User interfaces have traditionally relied on input devices such as keyboards, which require physical manipulation by a user. Increasingly, however, it is desired to detect and respond to more natural user input such as speech. Indeed, automated speech recognition has become a viable technology in certain environments, allowing users to provide spoken input to computerized systems. However, automatic speech recognition can be challenging in spacious environments and other environments where it is difficult to isolate the voice of a user from other noises—including ambient noises and the voices of other users.

Audio source separation may be used in some situations in an attempt to produce an audio signal that is focused on a particular area of the environment. For example, multiple microphones may be distributed throughout an environment in order to obtain audio signals from corresponding regions of the environment, and input from the microphones may be selected to emphasize a certain area. As another example, multiple directional microphones may be used to generate audio signals corresponding to different parts of an environment, and a particular area can be chosen by selecting one or more of the directional microphones. In some cases, microphone directionality may be dynamically configured using beamforming techniques in conjunction with a microphone array.

In situations where an audio signal may be tuned or selected to emphasize sound from different parts or areas of an environment, it may be possible to isolate spoken audio by detecting the location of the user within the environment and configuring the audio signal to focus on that location. If the user can be reliably located, this technique can improve the results of automatic speech recognition. However, it can be difficult to identify the user's location, particularly in situations where the user may be moving or where multiple users may speak at different times or even at the same time.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described below are systems and techniques for recognizing speech within an environment such as a room, in which one or more users may be present along with other sound sources, and in which users may move about and speak from different locations.

One or more microphones are positioned within the environment and used to obtain or produce multiple directional or focused audio signals that emphasize audio originating from different parts or regions of the environment. Audio beamforming may be used for this purpose in certain implementations, in response to audio signals generated by elements of a microphone array.

Automatic speech recognition is applied to each of the focused audio signals to produce corresponding text streams. In addition to recognizing speech, the automatic speech recognizer generates or estimates a confidence or accuracy score corresponding to each of the recognized text streams. The estimated confidence score for a particular text stream indicates the likely or predicted recognition accuracy or reliability of that text stream, as estimated by the speech recognizer.

In various embodiments, automatic speech recognition techniques may calculate and provide confidence scores in different ways. Furthermore, confidence scores may correspond to different parts of human speech, such as to individual phonemes, syllables, words, or phrases. In some embodiments, words or phrases of recognized speech may be compared to vocabularies, grammars, or lexicons to determine whether the speech corresponds to expected human speech input, and confidence levels may be based on whether or not the speech corresponds to any such expected speech input.

The confidence scores are compared to identify one or more of the recognized text streams having the highest confidence scores, and those text streams are then selected for use as system input.

Figure 1:
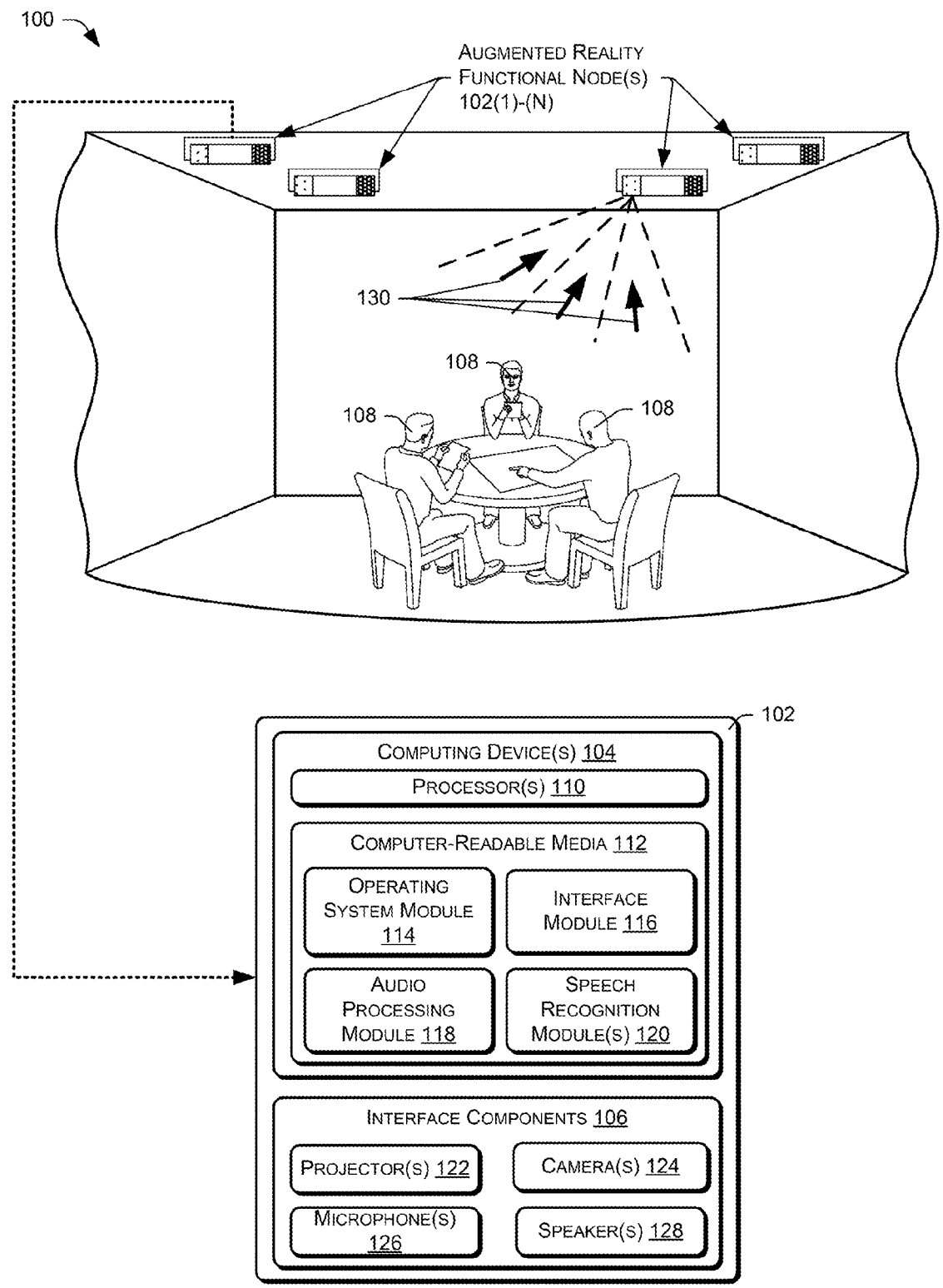
FIG. 1 illustrates an environment that includes an augmented reality functional node (ARFN) for monitoring and responding to user speech.

FIG. 1 shows an illustrative augmented reality environment 100 in which the described techniques may be performed. The environment 100 includes one or more augmented reality functional nodes (ARFNs) 102(1), . . . , 102(N) (collectively referred to as "the ARFN 102" in some instances). While the environment illustrates four nodes, in some instances an environment 100 may include any number of one or more nodes positioned at different locations throughout the environment 100. Furthermore, it is to be appreciated that the techniques described herein may be performed by a single ARFN, by a collection of any number of ARFNs, or by any other devices or combinations of devices.

As illustrated, each ARFN 102 may include one or more computing devices 104, as well as one or more interface components 106. The computing devices 104 and interface components 106 may be configured in conjunction with each other to interact with one or more users 108 within the environment 100.

As an example of operation, the ARFN attempts to monitor and recognize commands that are spoken by one or more of the users. In response to an appropriate command, the ARFN 102 may display specified content, such as video content, on a surface within the room. Recognizing the spoken commands of users within the environment may be performed using the techniques described below.

The computing device 104 of the example ARFN 102 may include one or more processors 110 and computer-readable media 112. The processor(s) 110 may be configured to execute instructions, which may be stored in the computer-readable media 112 or in other computer-readable media accessible to the processor(s) 110. The processor(s) 110 may include digital signal processors (DSPs), which may be used to process audio signals in accordance with the techniques described below.

The computer-readable media 112 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 104. The computer-readable media 112 may reside within a housing of the ARFN, on one or more storage devices accessible on a local network, on cloud storage accessible via a wide area network, or in any other accessible location.

The computer-readable media 112 may store various modules, such as instructions, datastores, and so forth that are configured to execute on the processors 110. For instance, the computer-readable media 112 may store an operating system module 114 and an interface module 116.

The operating system module 114 may be configured to manage hardware and services within and coupled to the computing device 104 for the benefit of other modules. The interface module 116 may be configured to receive and interpret commands received from users within the environment 100, and to respond to such commands in various ways as determined by the particular environment.

The computer-readable media 112 may include an audio processing module 118 that is executable to perform audio processing. In certain environments, the audio processing module 118 may implement beamforming techniques or other directional audio selection techniques as described below for focusing audio reception in different directions and/or on different parts of the environment 100.

The computer-readable media 112 may also include one or more speech recognition modules 120, which may be configured to perform speech recognition with respect to multiple focused audio signals as will be described in more detail below. When performing speech recognition, the speech recognition module(s) may produce text streams and associated confidence values. An individual text stream indicates any speech that is recognized, and the confidence score indicates the likelihood that such speech has been correctly recognized.

The ARFN 102 may include various interface components 106, such as user interface components and other components that may be used to detect and evaluate conditions and events within the environment 100. As examples, the interface components 106 may include one or more projectors 122, one or more cameras 124, one or more microphones 126, and one or more speakers 128. The interface components 106 may in certain implementations include various other types of sensors and transducers, content generation devices, and so forth.

The projector(s) 122 may be used to project content onto surfaces of the environment 100 for viewing by the users 108. The camera(s) 124 may be used for various purposes, such as detecting user gestures, determining the positions of objects within the environment 100, reconstructing 3D characteristics objects within the environment 100, and so forth.

The microphones 126 may be used to acquire input from the users 108. In particular, audio signals generated by the microphones 126 may be subjected to automated speech recognition to convert spoken commands to corresponding codes or text, which may in turn be consumed or responded to by other functional elements of the ARFN.

The microphone(s) 126 may be disposed within a chassis of the ARFN 102. In some cases, the microphones 126 may comprise a microphone array, which may be used in conjunction with beamforming techniques to produce directionally focused audio signals corresponding to different regions of the environment 100. In other cases, such a microphone array may be formed by microphones of multiple ARFNs 102 distributed throughout the environment 100. In addition, microphones 126 may be located at various known locations within the environment 100, such as on the walls or other surfaces of a room, and may be used in conjunction with various other audio source isolation techniques to produce audio signals that focus on different regions of the environment 100.

The speaker(s) 128 may be used by the ARFN 102 to provide audible output. For example, the speaker(s) 128 may be used to provide output from a text-to-speech module or to playback pre-recorded audio, possibly in conjunction with other media such as video.

The coupling between the computing device 104 and the interface components 106 may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within a projector, camera, or other device. Therefore, it is to be appreciated that the illustration of the ARFN 102 of FIG. 1 is for illustrative purposes only, and that components of the ARFN 102 may be configured in any other combination and at any other location.

Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

Figure 2:
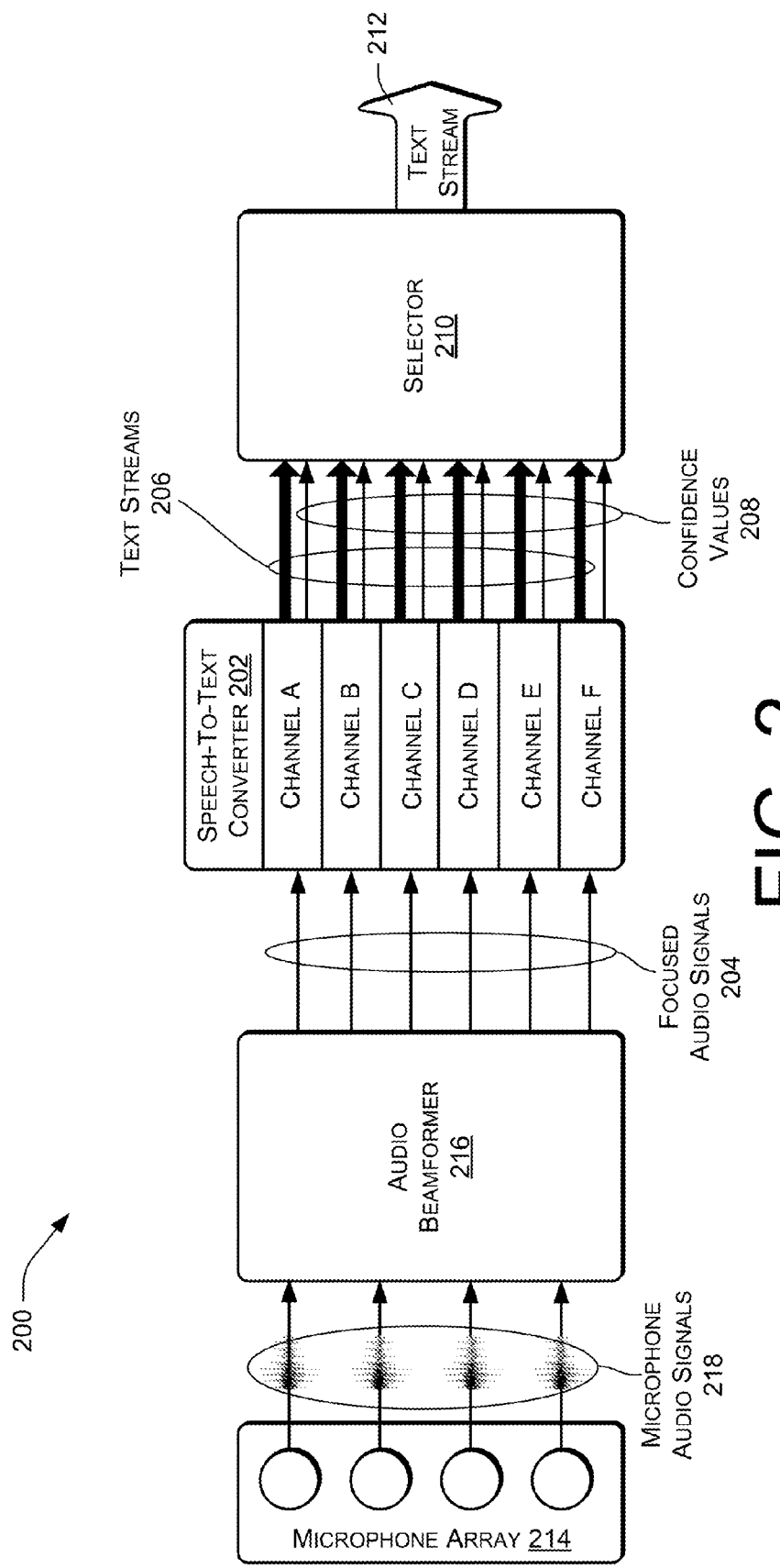
FIG. 2 is a block diagram illustrating the generation and selection of directionally focused audio signals for speech recognition.

FIG. 2 illustrates an example of a system 200 that may be used in the environment of FIG. 1 to recognize and respond to user speech. The system 200 is illustrated and described in functional terms, and may be implemented in various ways and using various technologies. As an example, the system 200 may be implemented by components of one or more of the ARFNs 102 depicted in FIG. 1. In some cases some of the described processing may be performed by remote computing devices such as servers and other network-based resources.

Generally, the system 200 comprises a speech recognizer or speech-to-text converter 202 that receives multiple directionally focused audio signals 204 and that performs automated speech recognition to produce corresponding text streams 206 and accompanying confidence values or accuracy scores 208. A selector 210 compares the confidence values 208 and selects one or more of the text streams 206 based on their confidence values 208. For example, the selector 210 may select the text stream 206 having the highest confidence value 208. The selected text stream is output by the selector 210 as an output text stream 212 and is used for system input, such by the ARFN 102 of FIG. 1 for receiving user commands.

The focused audio signals 204 may be generated in various ways, such as by selecting and/or weighting inputs from multiple distributed microphones, by physically positioning or directing one or more directional microphones, by electronically configuring one or more directional microphones, or by processing signals from multiple microphones to generate directional audio signals corresponding to different areas of the environment 100.

In the embodiment illustrated by FIG. 2, the focused audio signals 204 are produced or created using a microphone array 214 in conjunction with an audio beamformer or beamforming processor 216. The microphone array 214 may comprise a plurality of microphones that are spaced from each other in a known or predetermined configuration. For example, the microphones may be in a linear configuration or a circular configuration. In some embodiments, the microphones of the array 214 may be positioned in a single plane, in a two-dimensional configuration. In other embodiments, such microphones may be positioned in multiple planes, in a three-dimensional configuration. Any number of microphones may be used in the microphone array 214.

The microphone array 214 may comprise microphones that are located within a single ARFN 102. Alternatively, the microphone array 214 may comprise microphones of multiple ARFNs 102. Each microphone of the array 214 produces a respective microphone audio signal 218.

The beamformer 216 receives the microphone audio signals 218 and applies audio beamforming techniques to produce or generate the plurality of directionally focused audio signals 204. Audio beamforming, also referred to as audio array processing, uses a microphone array having multiple microphones that are spaced from each other at known distances. Sound originating from a source is received by each of the microphones. However, because each microphone is potentially at a different distance from the sound source, a propagating sound wave arrives at each of the microphones at slightly different times. This difference in arrival time results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones are combined in such a way that signals from a particular direction experience constructive interference, while signals from other directions experience destructive interference. The parameters used in beamforming may be varied to dynamically select different directions, even when using a fixed-configuration microphone array.

The audio beamformer 216 applies beamforming to the audio signals 218 so that each of the focused audio signals 204 corresponds to a different area, region, or zone of the environment 100, although the regions may in some cases overlap. In the described embodiment, each of the focused audio signals 204 contains or represents audio from a particular direction relative to the microphone array, and each direction corresponds to a particular area or region of the environment 100. The regions may be defined arbitrarily, such as by dividing the environment into equal areas. Alternatively, regions may be selected based on known or observed characteristics of the environment, such as by focusing on regions that are predicted to be the most likely locations of human activity. In some situations, these regions may be predicted based on past observation or detection of regions from which speech has originated.

In FIG. 1, one of the ARFNs 102 is shown as using a microphone array as described above to receive audio from three different directions, indicated by the arrows 130. In some implementations, each direction may correspond to a reception cone, with sounds generated toward or along the center of the cone being emphasized in comparison to sounds generated toward or outside the edges of the cone.

The multiple directionally focused audio signals 204 can be generated concurrently, and the speech-to-text converter 202 can be configured to concurrently produce the corresponding text streams 206 and confidence values 208. For example, in some implementations the multiple directionally focused audio signals 204 may be generated in parallel, using multiple beamformer instances or channels. Similarly, the speech-to-text converter 203 may be configured to produce the corresponding text streams 206 and confidence values 206 in parallel, using multiple instances or channels of the speech-to-text converter 203. In other implementations, the focused audio signals 204 may be produced sequentially, resulting in only a single text stream 206 and corresponding confidence value 208 at any given time. In this case, the system may be configured to sequentially evaluate different regions or zones of the environment, and to subsequently select the text stream 206 corresponding to the region or zone that produces the highest confidence value 208.

Figure 3:
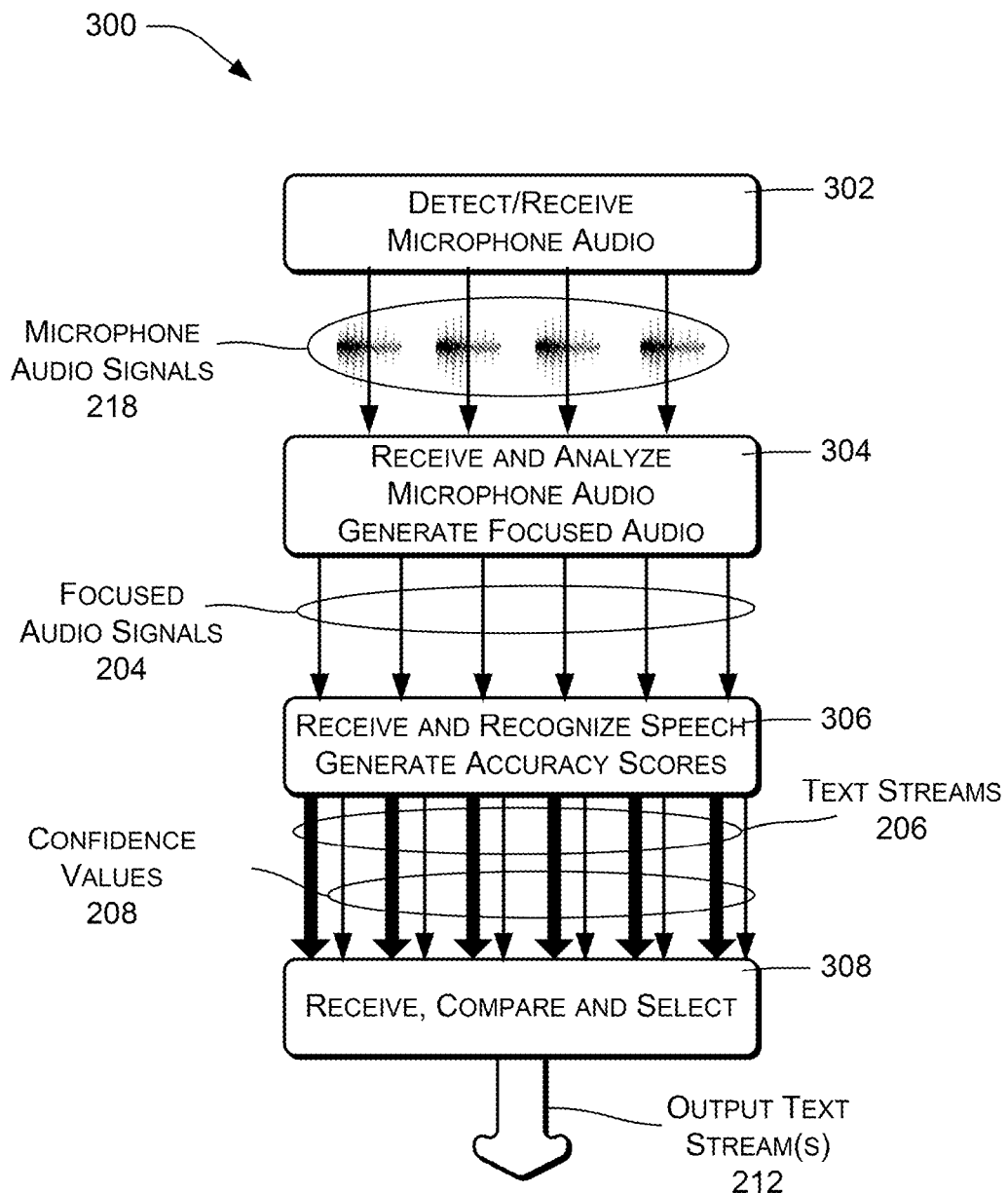
FIG. 3 is a flowchart illustrating an example method of generating and selecting directional audio input for speech recognition.

FIG. 3 illustrates an example method 300 of selecting one or more regions for speech recognition. An action 302 comprises capturing audio from an environment and generating corresponding audio signals, such as the microphone audio signals 218 described above. The microphone audio signals 218 may be generated by one or more microphones, such as a microphone array.

An action 304 comprises receiving and analyzing the microphone audio signals 218, and processing the microphone audio signals 218 to generate the focused audio signals 204. Beamforming techniques, based on combining amplitude-scaled and/or phase-shifted versions of the microphone audio signals 218, may be used to produce the focused audio signals 204. Each of the focused audio signals 204 is focused on and corresponds to a different, possibly overlapping region of an environment such as a room. In other words, an individual focused audio signal 204 is generated so that it emphasizes sounds originating from a particular direction and/or from a particular region of the environment, and/or so that it filters or attenuates sounds originating from other directions and/or from other regions.

The beamforming action 304 may be implemented by multiple beamformer instances or modules acting in parallel in response to the microphone audio signals 218 to generate the multiple focused audio signals 204. Any number of focused audio signals 204 may be generated in parallel, depending on the nature of the particular environment that is being monitored. The beamforming may be implemented using hardware, software, or a combination of both hardware and software. One or more digital signal processors may be used in some environments to perform the beamforming, as well as to perform other types of signal processing that may improve the results of subsequent speech recognition.

An action 306 comprises receiving the focused audio signals 204 and applying speech recognition in parallel to each of the focused audio signals 204, resulting in corresponding text streams 206. The speech recognition also includes generating the confidence values 208 corresponding to each of the text streams 206, indicating the estimated or likely accuracy of the speech recognition for each of the text streams 206. The confidence values may be generated by speech-to-text converter 202, based on its ability to match received audio with voice and grammatical models. Alternatively, different text streams may be compared against each other to determine whether they produce similar or identical results. Text streams that match other text strings may be assigned relatively higher confidence values. In addition, generating the confidence values may be based on comparing recognized text with expected speech input, which may vary depending on the available command lexicon of the system.

The speech recognition action 306 may be implemented by multiple automated speech recognizer channels, instances, or modules configured to act in parallel in response to the multiple focused audio signals 204, and to concurrently generate the multiple text streams 206 and associated confidence values 208. The speech recognition may be performed using hardware, software, or a combination of both hardware and software. One or more digital signal processors may be used in some implementations in conjunction with the action 306 in order to optimize the focused audio signals 204 prior to or as a part of the speech recognition.

An action 308 comprises receiving the text streams 206 and confidence values 208, comparing the confidence values 208, and selecting the recognized speech from one or more of the text streams 206 based on the comparing. In some implementations, the highest confidence value 208 may be identified and the corresponding text stream 206 selected for output as the output text stream 212. In other implementations, two or more of the confidence values 208 having the relatively highest values may be identified and the corresponding text streams 206 selected as multiple output text streams 212.

The one or more output text strings 212 may be provided to other functional components of the ARFN 102 for various purposes. For example, the ARFN 102 may monitor the output text stream 212 to identify any commands that may have been spoken by a user. The output text stream 212 may also be used for other purpose such as for transcribing the dictation of a user within the environment 100.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   a microphone array that produces audio signals in response to capturing audio from an environment;
   an audio beamformer that is responsive to the audio signals to produce a plurality of directionally focused audio signals corresponding respectively to different directions relative to the microphone array;
   a speech recognizer configured to:
      recognize speech from each of the directionally focused audio signals to create text streams of recognized speech; and
      generate a confidence value for each of the text streams of the recognized speech, wherein each confidence value indicates an estimated accuracy of a respective text stream of the recognized speech from a respective one of the directional audio signals, the confidence value generated based at least in part on expected speech input for an available command lexicon associated with the system; and
   a selector configured to compare each confidence value and to select at least one of the text streams of the recognized speech from at least one of the directionally focused audio signals based at least in part on the comparing.

2. The system of claim 1, wherein the directionally focused audio signals correspond to different regions of the environment.

3. The system of claim 1, wherein the directionally focused audio signals correspond to different regions of the environment, and wherein the different regions are selected based on predicted locations of human activity within the environment.

4. The system of claim 1, wherein the speech recognizer is configured to concurrently recognize different speech from the directionally focused audio signals.

5. The system of claim 1, further comprising one or more instances of the audio beamformer configured to concurrently produce the plurality of directionally focused audio signals.

6. A method, comprising:
   receiving audio signals corresponding respectively to different regions of an environment;
   analyzing the audio signals to recognize speech from each of the audio signals, wherein analyzing the audio signals comprises concurrently generating a plurality of different text streams that each correspond to a different one of the audio signals;
   generating a confidence value for each of the plurality of different text streams corresponding to the audio signals, wherein the confidence value for a particular text stream indicates an estimated accuracy of the recognized speech from said particular text stream, the confidence value generated based at least in part on expected speech input for a predetermined command lexicon; and
   selecting at least one of the plurality of different text streams associated with the recognized speech from at least one of the audio signals based at least in part on a respective confidence value.

7. The method of claim 6, further comprising:
   receiving microphone signals from an array of spaced microphones; and
   processing the received microphone signals to produce the audio signals.

8. The method of claim 6, further comprising:
   receiving microphone signals from an array of spaced microphones; and
   beamforming the received microphone signals to produce the audio signals, wherein the beamforming emphasizes audio from a particular direction relative to audio from other directions.

9. The method of claim 6, wherein the selecting comprises selecting the at least one of the plurality of different text streams associated with the recognized speech from the audio signal having a highest confidence value.

10. The method of claim 6, wherein analyzing the audio signals comprises concurrently recognizing speech from each of the audio signals.

11. The method of claim 6, wherein receiving the audio signals comprises concurrently receiving the audio signals.

12. The method of claim 6, further comprising generating the received audio signals by a plurality of microphones that capture spoken words of different people to generate the received audio signals.

13. One or more non-transitory computer-readable media storing computer-executable instructions that, when executed by one or more processors, cause the one or more processors to perform acts comprising:
   receiving a plurality of audio signals that are focused respectively on different regions of an environment;
   analyzing the audio signals to recognize speech from each of the audio signals by concurrently generating a plurality of different text streams that each correspond to a different one of the audio signals;
   generating a confidence value for each of the plurality of different text streams corresponding to the audio signals by:
      comparing different text streams against each other to determine that a first text stream produces similar or identical results as a second text stream of the different text streams; and increasing a first confidence value associated with the first text stream based at least in part on the first text stream producing similar or identical results as the second text stream, wherein the confidence value for a particular text stream indicates an estimated accuracy of the recognized speech from the particular text stream;

comparing confidence values generated for each of the plurality of different text streams associated with the different audio signals; and selecting one or more of the audio signals based at least in part on the comparing.

14. The one or more non-transitory computer-readable media of claim 13, wherein the generating comprises comparing the recognized speech to expected speech.

15. The one or more non-transitory computer-readable media of claim 13, the acts further comprising:

receiving microphone signals from an array of spaced microphones; and processing the received microphone signals to produce the audio signals.

16. The one or more non-transitory computer-readable media of claim 13, the acts further comprising:

receiving microphone signals from an array of spaced microphones; and beamforming the received microphone signals to produce the audio signals, wherein the beamforming emphasizes sound from a particular direction relative to sound from other directions.

17. The one or more non-transitory computer-readable media of claim 13, wherein the selecting comprises selecting the audio signal having a highest confidence value.

18. The one or more non-transitory computer-readable media of claim 13, wherein analyzing the audio signals is performed concurrently on each of the audio signals.

19. The one or more non-transitory computer-readable media of claim 13, wherein receiving the audio signals comprises concurrently receiving the audio signals.

20. The one or more non-transitory computer-readable media of claim 13, wherein the selecting one or more of the audio signals based at least in part on the comparing further comprises selecting at least one of the plurality of different text streams based at least in part on the comparing.

\* \* \* \* \*